United States Patent
McCarthy et al.

(10) Patent No.: US 7,700,017 B2
(45) Date of Patent: Apr. 20, 2010

(54) METHOD FOR PRODUCING MATERIALS FROM RECYCLED GLASS AND CEMENT COMPOSITIONS

(75) Inventors: Timothy McCarthy, Brooklyn, NY (US); Carol A. McCarthy, legal representative, Brooklyn, NY (US); Sriram Rangarajan, Hillside, NJ (US)

(73) Assignee: Icestone LLC, Brooklyn, NY (US)

( * ) Notice: Subject to any disclaimer, the term of this patent is extended or adjusted under 35 U.S.C. 154(b) by 0 days.

(21) Appl. No.: 10/925,199

(22) Filed: Aug. 24, 2004

(65) Prior Publication Data

US 2005/0045069 A1 Mar. 3, 2005

Related U.S. Application Data

(60) Provisional application No. 60/497,621, filed on Aug. 25, 2003.

(51) Int. Cl.
*B28B 1/087* (2006.01)
*B28B 13/02* (2006.01)
(52) U.S. Cl. .................. 264/71; 264/333; 264/915
(58) Field of Classification Search ............ 264/71, 264/333, 338, 915, 72; 428/325
See application file for complete search history.

(56) References Cited

U.S. PATENT DOCUMENTS

| | | | | |
|---|---|---|---|---|
| 1,600,514 A | * | 9/1926 | Seailles et. al. | 106/692 |
| 2,018,192 A | * | 10/1935 | Sexton | 264/71 |
| 2,744,831 A | * | 5/1956 | McCoy | 106/728 |
| 3,503,766 A | * | 3/1970 | De Maria | 106/719 |
| 3,856,054 A | * | 12/1974 | Steinberg et al. | 138/174 |
| 4,002,482 A | * | 1/1977 | Coenen | 501/33 |
| 4,090,884 A | * | 5/1978 | Goeman | 106/711 |
| 4,115,135 A | * | 9/1978 | Goeman | 428/55 |
| 4,210,457 A | | 7/1980 | Dodson et al. | |
| 4,605,443 A | | 8/1986 | MacDowell | |
| 4,689,084 A | * | 8/1987 | Ambroise et al. | 106/711 |
| 4,793,861 A | * | 12/1988 | Sohm | 524/5 |
| 4,880,467 A | * | 11/1989 | Rirsch et al. | 524/8 |
| 4,981,626 A | * | 1/1991 | Uchizaki | 264/426 |
| 4,994,114 A | * | 2/1991 | Thiery et al. | 106/713 |

(Continued)

FOREIGN PATENT DOCUMENTS

CH 688550 A5 * 11/1997

(Continued)

OTHER PUBLICATIONS

Derwent Abstract of CH 688550 A5, 1997, Derwent Information Limited, Derwent Week # 199750.*

(Continued)

*Primary Examiner*—Matthew J. Daniels
(74) *Attorney, Agent, or Firm*—Dara L. Onofrio, Esq.; Onofrio Law

(57) ABSTRACT

A method of producing material from recycled glass comprising: preparing a mixture of glass in a cementitious matrix, and an alkali-silica reaction suppressant; providing a mold of the material and coating said mold with a release agent; casting said mixture into said mold; curing said mold; and removing the material from said mold. The recycled glass and concrete compositions are: 25-79% by weight glass; 8-35% by weight cement and up to 22% by weight of an alkali-silica reaction suppressant.

12 Claims, 1 Drawing Sheet

PROCESS FLOW CHART

U.S. PATENT DOCUMENTS

| | | | |
|---|---|---|---|
| 5,690,729 A | | 11/1997 | Jones, Jr. |
| 5,720,835 A | | 2/1998 | Lingart et al. |
| 5,735,947 A | | 4/1998 | Hopkins et al. |
| 5,779,957 A | * | 7/1998 | Champomier et al. ....... 264/151 |
| 5,803,960 A | | 9/1998 | Baxter |
| 5,810,921 A | * | 9/1998 | Baxter et al. ................. 106/711 |
| 5,810,981 A | | 9/1998 | Komada et al. |
| 6,027,561 A | * | 2/2000 | Gruber et al. ............... 106/718 |
| 6,030,447 A | * | 2/2000 | Naji et al. ................... 106/718 |
| 6,296,699 B1 | * | 10/2001 | Jin ............................... 106/814 |
| 6,344,081 B1 | | 2/2002 | Pelot et al. |
| 6,346,146 B1 | | 2/2002 | Duselis et al. |
| 6,488,762 B1 | * | 12/2002 | Shi .............................. 106/676 |
| 6,506,248 B1 | | 1/2003 | Duselis et al. |
| 6,610,224 B2 | | 8/2003 | Sullivan |
| 6,627,315 B2 | | 9/2003 | Sakai |
| 6,743,287 B2 | * | 6/2004 | Sunde ......................... 106/697 |
| 6,770,328 B1 | | 8/2004 | Whaley |
| 6,840,996 B2 | | 1/2005 | Morioka et al. |
| 6,913,643 B2 | | 7/2005 | Dejaiffe |
| 2002/0053304 A1 | | 5/2002 | Pelot et al. |
| 2003/0037707 A1 | * | 2/2003 | Sunde ......................... 106/713 |
| 2003/0037708 A1 | | 2/2003 | Monawar |
| 2003/0041783 A1 | * | 3/2003 | Monawar .................... 106/716 |
| 2003/0188669 A1 | | 10/2003 | Sobolev et al. |
| 2004/0007162 A1 | | 1/2004 | Morioka et al. |
| 2004/0106704 A1 | | 6/2004 | Meyer et al. |
| 2004/0187740 A1 | | 9/2004 | Timmons |
| 2004/0261666 A1 | | 12/2004 | Shimanovich et al. |
| 2005/0000393 A1 | * | 1/2005 | Virtanen ..................... 106/811 |
| 2005/0028556 A1 | * | 2/2005 | Akai et al. ................... 65/21.2 |
| 2006/0130707 A1 | | 6/2006 | Grasso, Jr. et al. |

FOREIGN PATENT DOCUMENTS

| | | | |
|---|---|---|---|
| FR | 2795359 A1 | * | 12/2000 |
| JP | 2003-137638 A | * | 5/2003 |
| JP | 2003-306373 A | * | 10/2003 |
| WO | WO 0179131 | * | 4/2000 |

OTHER PUBLICATIONS

English Abstract of FR 2795359 A1, 2000, European Patent Office.*

English Machine Translation of JP 2003-137638 A, Jul. 2005, Japanese Patent Office website.*

English Machine Translation of JP 2003-306373 A, Jul. 2005, Japanese Patent Office website.*

Meyer, Christian, Use of Recycled Glass and Fly Ash for Precast Concrete, The New York State Energy Research and Development Authority, (Oct. 1998), 145 pages.*

The Department of Civil Engineering & Engineering Mechanics, Development of Glass Concrete Products (Final Report for State of New York, Empire State Development, Office of Recycling Market Development), Mar. 1999.

Christian Meyer, Glass Concrete, Concrete International, Jun. 2003.

* cited by examiner

PROCESS FLOW CHART

METHOD FOR PRODUCING MATERIALS FROM RECYCLED GLASS AND CEMENT COMPOSITIONS

This application claims the benefit of U.S. provisional application No. 60/497,621 filed Aug. 25, 2003, which is incorporated herein by reference.

FIELD OF THE INVENTION

The present invention relates generally to compositions comprised of recycled glass and cement, and more particularly to a method for producing materials made from these compositions.

BACKGROUND OF THE INVENTION

In general, the use of building materials comprised of recycled glass and cement has been difficult to achieve due to the composition of glass which is primarily silica. When glass is combined with cement, the presence of the silica causes a reaction with the alkali in cement which causes excessive expansion and cracking or popouts in the concrete thus rendering it useless as a building material.

It is known in the industry to introduce aggregates such as sand and stone to cement to strengthen the concrete mixtures, but the invention provides an alternative to these materials by incorporating waste or recycled glass material as the aggregate material. The formulations according to the invention include an alkali-silica reaction (ASR) suppressant which enables the production of a uniform material that is resistant to cracking due to ASR.

Accordingly, the present invention is directed to new and improved methods and improved formulae, for producing materials, preferably of comparatively large size (4 ½'×8 ½') from a mixture of cement, waste glass, an ASR (alkali-silica reaction) suppressant. Other additives and pigments may also be included in the mixtures. The methods disclosed herein lend themselves to fully automated and semi-automated production, as well as batch production of discrete materials.

The invention cement-recycled glass products are considered "green" or "eco-friendly" and are sustainable as a building material. The chemical composition is inert, non-toxic and primarily inorganic (>90%) and is a material that is chemically durable and fire resistant. The organic content in this product is typically <1%. The composition can be tailored to create a variety of colors and/or match specific application requirements or functional properties.

The invention also provides a method to create a cement-recycled glass product using a production process that is essentially the same for all of the applications and variations. This invention also provides a method to create the product in a large as well as thin format. This product dimensions can range up to 60"×120" while the thickness can range up from 0.5" to 2" inches or more.

It is therefore a general object of the invention to provide a composition made of glass, cement and an alkali-silica reaction suppressant.

Another general object of the invention is to produce a material that has the strength of quarried stone and actively reduces the waste stream by redirecting glass from landfills to be cleaned and sorted and used in the compositions of the invention.

Another object is to provide a method for producing a building material from recycled glass by preparing a mixture of ground glass in a cementitious matrix including an alkali-silica reaction suppressant and casting the mixture into a mold which is then cured to produce the material.

A more specific object of the invention is to provide building materials for use in a variety of applications such as kitchen, bath and vanity countertops, interior and exterior walls, flooring and other related products.

Another more specific object of the invention is to provide building materials for 3-dimensional products such as sinks, bath-tubs and other similar products.

Another specific object of the invention is to produce a product in a large format panels, slabs and tiles. The size of these materials can range up to 120"×60".

SUMMARY OF THE INVENTION

The present invention provides a method of producing material from recycled or waste glass material by first preparing a mixture of ground or crushed glass in a cementitious matrix. An alkali-silica reaction suppressant is introduced to the mixture. It is noted that no high temperature processes are used to prepare the mixture and combine the components. A mold of the material to be produced is prepared, which in preferred applications is a rectangular flat panel form. This mold is preferably coated with release agent for easy removal of the resulting material. The mixture is cast into the mold, cured and then removed for use as a building material for a variety of applications.

The cementitious matrix of the invention is made of a mixture of calcium silicates, alumino silicates, calcium aluminosilicates, aluminates and ferrite phases. This is typically achieved by combining of hydraulic cement and a ASR suppressant. Preferably, the hydraulic cement is of Portland Type I, II or III and the ASR suppressant is metakaolin, although other materials can be used that prevent this reaction from occurring.

The recycled glass is present in the composition, preferably in a range between 25-79 wt. % and more preferably over 60 wt. %; and is in a crushed or ground form that has a particle size in the range of 1 μm to 25 mm, and more preferably in the range of 50 μm to 10 mm.

The curing of the material is in a closed chamber, where the mixture is cured to a solid state under humidity ranges from 70% to 100% relative humidity (RH) and at temperatures between 50° F. to 185° F.

The method of the invention further includes a vibrating step where after the mixture is cast into the mold, it is subjected to vibration to distribute the mixture uniformly within the mold. This step helps to release entrapped air bubbles which if present will increase porosity and cause the material to crack.

The mold is preferably in the form of a flat panel, although other shapes are encompassed by the invention process. In a preferred embodiment the panel formed is rectangular and has dimensions ranging up to 60"×120" and is over 0.5" in thickness. The molds also may be in the form of 3-dimensional objects.

In general, the compositions used in the invention are:
- 25-79% by weight glass; and
- 8-35% by weight cement, preferably a hydraulic cement such as Portland cement Type III; and
- up to 22% by weight of an alkali-silica reaction suppressant;

As previously described, the alkali-silica reaction suppressant is preferably metakaolin. Other pozzolonic materials such as fly ash, blast furnace slag and silica fume can be used as a partial or complete replacement of metakaolin.

The composition further includes a dispersant present in an amount up to 3% by weight. The dispersant used in the compositions preferably include commercially available polycarboxylate based concrete dispersants such as Glenium 3000 or Glenium 3200 available through Degussa Admixtures, Inc. (formerly Masterbuilders Inc.), Cleveland, Ohio. Other dispersants such as naphthalene based, melamine based and lignosulphate based can also be used. These are also available through concrete chemical vendors such as Degussa Admixtures, Inc. (formerly Masterbuilders Inc.), Cleveland, Ohio; Sika Corporation, Lyndhurst, N.J. and Grace Construction Products, Cambridge, Mass.

According to the invention the glass and said cement components are present in ratio of from 5/7 to 10/1, and more preferably from 3/1 to 10/1. The recycled glass content in the resulting material ranges from 25 to 79% by weight, but is preferably over 60% by weight.

A pigment component may also be included in the compositions, present in an amount up to 15% by weight. Pigments used are commercially available concrete pigments and stains or may be recycled from waste material. These are typically inorganic iron oxide and other metal oxide pigments. These pigments are available from Lanxess Corporation (formerly Bayer Chemicals), Pittsburg, Pa.; Davis Colors, Los Angeles, Calif.; Solomon Colors, Springfield, Ill.; Heucotech, Fairless, Pa.; and Pemco, Baltimore, Md. Organic dyes and materials such as carbon black can also be used.

A fiber component may also be included in the compositions, present in an amount up to 5% by weight. Fibers such as glass fibers, nylon fibers, polypropylene fibers and steel fibers can be added to increase flexural strength and durability of the product. These product also are standard concrete industry products.

Other materials which may be included in the compositions include stone chips, shell chips, mother of pearl chips, metal chips, air-entraining agents, anti-foaming agents, viscosity modifying agents and other concrete chemicals. These materials are typically used to increase functional performance either during processing or use and/or enhance the aesthetic appearance of the product.

Other objects, features and advantages of the present invention will be apparent when the detailed description of the preferred embodiments of the invention are considered with reference to the drawings, which should be construed in an illustrative and not limiting sense as follows:

DETAILED DESCRIPTION OF THE PREFERRED EMBODIMENTS

Definition of Terms

Figure 1:
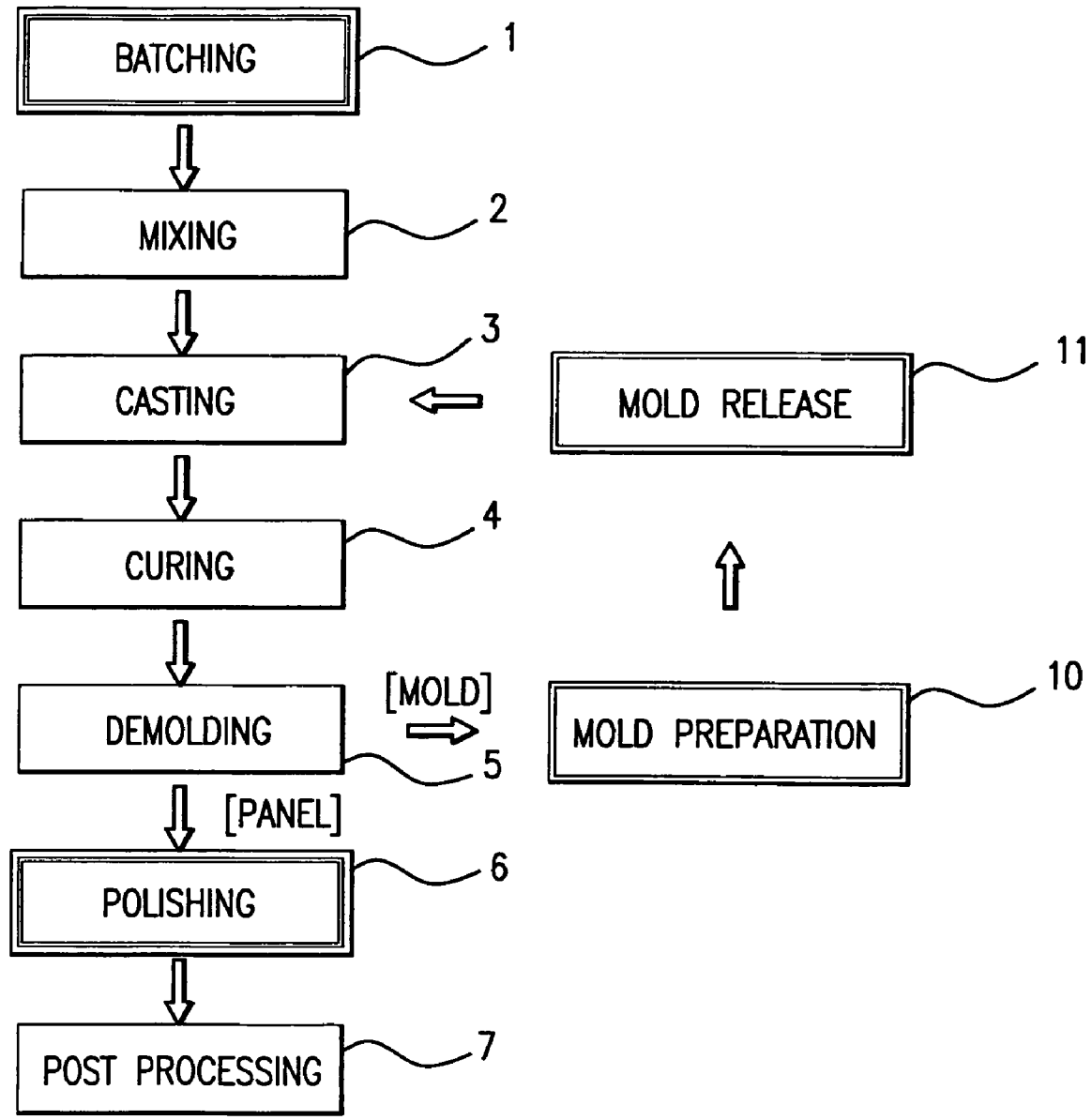
FIG. 1 is a flowchart showing the steps involved in the manufacturing process according to the invention.

The following terms are used in throughout the specification and have the meaning ascribed below unless otherwise indicated.

"ASR": An alkali-silica reaction suppressant.

"MK": An ASR suppressive additive known as metakaolin.

"−1+2", "−2+4", "−4+8", "−8+16", "−16+30", "−30+50", "−50+100", "−100+200", "−200": typical particle size ranges for the glass aggregate. The numbers denote ASTM standard mesh sizes For example, −8+16 corresponds to glass particles that range in size from No. 8 mesh (2.38 mm) to No.16 mesh (1.19 mm).

"Fabrication": The final phase of the production process, including transforming an invention panel into a countertop or other article. This step includes sub-processes such as routing, cutting to a specified size, etc.

Compositions

The invention compositions are primarily composed of ground/crushed glass (silica) in a cementitious matrix that is typically a mixture of silicates, ferrites and aluminates. The cementitious material acts as a binder while the glass particles act as a reinforcement. However, other materials maybe incorporated into the product to enhance the product performance and appearance, increase processing ability. The components used in producing the material of the invention are as follows:

Glass: Glass (amorphous $SiO_2$) typically of the recycled or waste glass is used in the compositions in a crushed/ground form. Total glass use ranges from 25% to 79% by weight. Particle sizes range from fine glass (1 μm) to coarse glass particles (25 mm), more preferably from 50 μm to 10 mm. Control of particle size distribution is frequently required because particle size distribution controls a variety of functional as well as aesthetic properties of the product. To be specific, it directly affects viscosity in the slurry state, porosity in the product and mechanical properties such as flexural strength. In order to maintain/achieve a certain particle size distribution, the total glass used is broken down by size and amount. Varying the amounts within each size range will yield different particle size distributions. The products can, depending on application and aesthetics, have different particle size distributions. (Note: particle size distribution can also be manipulated using other sieve sizes and standards.). There is no limitation on the type of glass and a variety of glass types (and colors) can be used. Although the glass used is color separated, there is also no limitation on mixing and matching various glass type. Examples of glass types that are usable in the product are borosilicate glass, E-glass, soda-lime (plate or flint or clear) glass and colored glass types such as cobalt blue, emerald green, champagne green, amber, etc.

Cement: This component is preferably a hydraulic cement that is usually a combination of silicates, aluminosilicates, aluminates and, ferrites. Preferably, a Portland cement, Type I or Type II or Type III is used in the invention formulations. However, other types of cement such as slag cement, (and other blended cements), polymer modified cements, etc. can be used. Usage range is 8% to 35% by weight.

Water: Water exists in both a chemically bound and unbound state in the resulting material. Water content ranges from 4% to 20% by weight in the slurry state. A portion of this water is absorbed in the chemical reaction during curing.

Dispersant: The dispersant is used control flow characteristics of the slurry of the glass/cement mixture. Typical dosage ranges from 0%-3% weight. Although a variety of concrete dispersants are available for this purpose dispersants with polycarboxylate based chemistry are preferably used. The dispersant used in the compositions are commercially available polycarboxylate based concrete dispersants such as Glenium 3000 or Glenium 3200 (available through Degussa Admixtures, Inc. formerly Masterbuilders Inc., Cleveland, Ohio) Other naphthalene based, melamine based and lignosulphate based dispersants can also be used. These are also available through concrete chemical vendors such as Degussa Admixtures, Inc. (formerly Masterbuilders Inc.), Cleveland, Ohio; Sika Corporation, Lyndhurst, N.J. and Grace Construction Products, Cambridge, Mass.

A viscosity modifying agent is used to further modify the flow characteristics such as viscosity and yield stress. Dosage rate varies from 0% to 1% by weight.

An ASR suppressant is incorporated into the compositions, preferably metakaolin (amorphous alumino-silicate) and is added from 0% to 22% by weight. Other pozzolonic materials such as fly ash, blast furnace slag and silica fume can be used as a partial or complete replacement of metakaolin.

Pigments: Pigments are added to create a variety of colors. Pigment weight fraction can be 0% to 15%. Typically, these pigments are available in primary colors and would require blending to create a color palette consisting of various secondary colors. These pigments are commercially available and are typically inorganic iron oxide and other metal oxide pigments. Organic dyes and materials such as carbon black can be used. These pigments can be obtained from Lanxess Corporation (formerly Bayer Chemicals), Pittsburg, Pa.; Davis Colors, Los Angeles, Calif.; Solomon Colors, Springfield, Ill.; Heucotech, Fairless, Pa.; and Pemco, Baltimore, Md. Examples of pigments used in invention compositions to create color palette are: black (iron oxide based and copper-chromium-iron spinel based), yellow (iron oxide based, chromium-titanium-antimony oxide based and nickel-antimony-titanium oxide based), red (iron oxide based), blue (cobalt oxide and cobalt spinel based), green (chromium oxide, cobalt-nickel-zinc-titanium-aluminum spinel based and chromium spinel based) and white (aluminum oxide based and titanium oxide based).

A fiber component may be added as additional reinforcement in amounts from 0% to 5% by weight. Fibers such as glass fibers, nylon fibers, polypropylene fibers and steel fibers can be added to increase flexural strength and durability of the product. These products also are standard concrete industry products Mineral additives such as Fly Ash ASTM Class C and Class F type pozzolon (typically an amorphous siliceous and aluminous material) and Blast Furnace Slag (typically calcium silicate and calcium alumino-silicate). Both fly ash and slag are both byproducts of the coal burning and iron manufacturing. Silica fume can also be used as partial replacement for cement. These are added to increase recycled content, and/or ASR suppression and/or modify mechanical properties and/or modify processing performance (such as curing characteristics).

Other materials can also be incorporated including, stone chips, shell chips, mother of pearl, quartz chips, scrap plastic, metallic structure such as rebar or mesh, metal chips, air-entraining agents, anti-foaming agents, viscosity modifying agent. These materials may be incorporated into the compositions to enhance appearance or improve performance. For example, Mother of pearl can be used for appearance, air-entraining agents can be used for freeze-thaw resistance, viscosity modifying agent can be used for improving processability, etc.

Production Process

The production method employs a slurry casting process to create a building material, preferably in the shape of a panel. FIG. 1, illustrates the general process flow and sequence step of the various unit operations according to the invention.

Mold preparation: The molds for the invention 10 materials need to be cleaned and have an appropriate mechanism for release 11 of the materials after curing. This release mechanism can be any of the following or combination:

i. Mold with detachable sides to facilitate material removal;
ii. Mold with side that posses a draft angle. Draft angle should be greater than 5° to facilitate demolding operations
iii. Mold coated with Teflon (e.g.polytetrafluorethylene) or other "non-stick" agents.
iv. Mold with liners made with materials such as ruuber or latex or polyethylene, etc.
v. Mold coated with appropriate mold release agents for easy release of the material cast.

In addition, molds need to be cleaned prior to use. Proper cleaning avoids defects in the cast panels such as chipping, poor surface finish (due to material adhesion to the mold), cracks (due to improper shrinkage or during demolding), etc.

Batching : Batching 1 of materials requires a mechanism to accurately weigh each and every component in the product. This can be accomplished by a number of methods and are common practice in many automated as well as non-automated manufacturing. Care must be taken however to batch certain ingredients like water, dispersant, etc. within a limited timeframe and/or specified sequence. Time is also important from a product capacity standpoint and is best accomplished using an automated system such as that available for this invention.

Mixing: Mixing 2 of the components must be accomplished under conditions that are: (a) fast enough to avoid "setting" or curing of the product during operation; and (b) efficient enough to breakdown agglomerate and mix materials thoroughly. These conditions are best achieved with high rpm counter current type mixer as was used for this invention although other mixers could potentially also be used.

Casting: Casting 3 into the molds can be either by weight or volume. Again, a wide variety of material delivery mechanisms are available and can be used to deposit the slurry into the mold. Examples of casting mechanisms are:

(a) A hopper with a gate opening to release the materials into a mold below such as in this invention. The hopper is attached to load cells and is therefore able to monitor the weight of the material in the mold through the "loss in weight" method.
(b) Same as above except the tray sits on load cells and is able to monitor the weight of the material directly.
(c) Any of the above in combination with a mechanism to control the weight of the panel in a automated fashion. This can be accomplished for example by a traveling hopper. The hopper travels across the length and/or breadth of the mold to deposit material uniformly. In addition, a gate control mechanism is able to release the material into the mold in a controlled manner. Alternative mechanisms involve moving the mold with respect to the hopper.
(d) A volume based method, which is accomplished by having molds of the right volume and dimension (length, breadth and height). This volume is then completely filled. All excess materials are scrapped off.

Vibration: The mold along with the material is subjected to a controlled vibration to spread the material in the mold evenly and to release all entrapped air. In order to accomplish this the table needs to be designed such that it can transmit all vibrational energy into the slurry for which the table must possess an adequate vibrational isolation mechanism and clamping mechanism. The mold is also designed to be "Stiff" to resist deflection under vibrations or the weight of the slurry. Vibration frequency and amplitude should be suitable for efficient leveling and consolidation. Vibration frequency lies in the range of 10-200 Hz while the vibration amplitude lies in the 0-5 mm.

Curing: Curing 4 is also performed under controlled conditions. The curing temperature and humidity need to be carefully controlled. Curing temperatures range from 50° F. to 185° F. while humidity range from 70% RH to 100% RH. Various heating and humification mechanisms can be employed. Steam curing is one method while the other method is to use a combination of mister/humidifers and a heater. The invention materials were cured under both conditions.

Demolding: Materials are demolded 5 from the mold using a suitable release mechanism and apparatus. After demolding the mold itself is sent back for casting of another panel material. It is sent to mold preparation steps 10 and 11 prior to casting 3. The finished panel is sent on to polishing step 6.

Polishing: The step is a finishing step. The materials may be polished using a set of abrasive pads and polisher.

Of these, the first seven steps are the main steps involved in creating the invention material. Polishing 6 is a finishing process that enhances the product and adds value. This step may not be needed for all applications. Panels may also be subjected to further post-processing operations 7 and fabrication before end use.

Equipment and Apparatus to Create Invention Materials

The apparatus/equipment to create the invention materials are: batch plant (Batching, Mixing, Casting and Vibration), Curing, Material Handling and Polishing. These "off-the-shelf" apparatus/equipment have been modified and customized to manufacture invention panels. In addition, the modified apparatus allows for the manufacture of materials in a reliable and commercial scale.

Batch Plant (i) Batch and Mixing

In this step of the process, the raw materials are weighed according to the formula chosen and mixed in appropriate proportions. There are four principal systems that are used to perform this step. A screw conveyor system transports the glass, cement and MK to the weighing scales, while the water and dispersant are delivered separately. The coloring system mixes the various color components in the required proportions. All these materials are delivered to the mixing system for combination into a slurry by two large mixers. An electronic automation system coordinates and controls all steps. The batching and mixing can be operated in manual mode if necessary for special applications and projects. Depending on thickness and size, the system can batch and mix materials for 1 to 6 panels at a time.

(ii) Materials Delivery System

Cement is initially stored in a 40-ton capacity cement holding bin that is vented through a blower/return system. The cement is directly transported to weighing scales using a 10 HP electric motor and a 40' auger material conveyor. Level indicators provide warning signals when low cement levels are reached.

The glass and MK materials are similarly transported from high capacity (two tons) material holding bins (vented through blower/return systems) to the weighing scales using a motor-driven 30' material conveying auger.

Dispersant is pumped from a storage tank to the mixers. The fluid dispersant is pumped and metered to a secondary tank as required by the formula used and then delivered to the mixer on receiving a signal from the automation system. Water is added directly to the mixer with the required amount controlled by a water meter.

Three 500 pound weight measurement disbursement bins are used to weigh and disburse material into the two mixers. One of these scales services both mixers using a bi-directional augur, while the other two scales are dedicated, one to each mixer.

(i) Mixer System

In accordance with the invention, there are two mixers, a 2,500 lb. capacity cement mixer and a 1,680 lb. capacity cement mixer. The mixer blades are driven by two 20 HP electric motors. A 250 psi capacity hydraulic motor operates a gate to drop material from each mixer (after mixing) into the hopper. A dust controller is attached to each mixer. The mixers have internal water cleaning systems as well as an external high pressure (1000-psi) water jet system for cleaning the mixer. This in turn creates the ability to manufacture a variety of colors without contamination.

(ii) Coloring System

The coloring system consists of six material bins, each transporting pigments to a pigment mixer using augers, similar to the ones used in the batching system. Six bins creates the ability to mix primary colors and create a whole range of secondary colors. The amount of pigment and water added is measured by a weighing scale that is attached directly to the mixer and is in accordance with the basic product formula. The operation can be performed manually or automatically and has the capability of selecting a variety of pre-programmed colors.

Casting

The slurry for the invention materials is cast into a mold, preferably an 96 in.×52.5 in. specifically designed mold. There are three subsystems that are included in this process: (i) the Conveyor system; (ii) the Casting system and (iii) the Vibrating system. The conveyor system brings molds to and from the vibrating table. The slurry is poured into a mold resting on the vibrating table and the casting is performed using the casting system. The slurry is consolidated and leveled using vibration, in the vibrating system.

(i) Conveyor System

The mold is conveyed to and from the vibrating table preferably using a double geared reinforced chain. This chain mechanism is driven by hydraulics and supported by a steel structure. The steel structure also provides a guide rail for the molds. The transfer of molds from and to the conveyor system, to and from, the cure chamber is achieved using a bridge carrier system. The conveyor systems can be operated in automatic, semi-automatic and manual modes and are coordinated with the batching system, i.e. a signal from the batching system initiates mold delivery in the automatic mode.

Alternateively, the molds can be transport in and out of the curing chamber with a forklift. In this case, the molds are conveyed to a transfer table using the conveyors. The mold are then lifted and placed in respective racks.

(ii) Casting System

The casting system controls the opening and closing of the mixer hopper doors and hence the flow of slurry into the mold, as well as the conveyor rollers, position of the mold, and vibration of the mold. The vibrational system, described hereafter, is controlled by the casting system, which may be operated in automatic, semi-automatic and/or manual mode as required. The casting of the invention material is preferably done on the vibrating table.

(iii) Vibrating System

Advantageously, the vibrator includes a roller table, vibrating table, penetrating through the roller table and clamps, to hold the molds in place. The control allows for raising and lowering the vibrating table below and above the rollers and changing the vibration amplitude.

When the slurry is ready for casting, the conveyor system delivers a mold to the exact position for casting.

The slurry is poured along the length of the mold so that the material is uniformly distributed along the length of the mold. When all the material is poured, the mold is vibrated for approximately three minutes at a vibrational amplitude of 35. The filled mold is then conveyed to the curing chamber.

Curing

Invention materials have been cured using one of two methods.

Method 1: A special curing chamber with storage racks for filled molds is provided. The panels cure to a reasonable strength in the chamber. A bridge conveyor system delivers the filled mold into the cure chamber. It is picked up by an automated robot and placed along racks within the cure chamber.

(i) Robotic System

The automated robot picks up the molds on the conveyors and transports them to racks along various bays. The robotic system ensures panel transport without jerking. After curing the panels are removed and transported by another set of conveyors to the demolding station.

(ii) Environment Control System for Cure Chamber

The environment control system includes a water heater, moisture distributor (mister), a humidity controller and heater. Heated water from the water heater is misted into the chamber using the mister whose operation is regulated by a humidity controller. The temperature is controlled independently. Additional heater can be used to to further increase the temperature of curing.

Method 2: In this method, the panels are transported to a steam curing kiln. In this case, the panels are transported to kiln using a forklift. The panels are then subjected to a pre-programmed curing cycle.

Demolding

In this step, cured panels from the cure chamber are removed from the molds. A vacuum lifter and crane assembly is used. This system consists of an electric powered hoist that travels linearly along an I-beam and vacuum gripper. The vacuum gripper, attached to the hoist, removes the panels from the molds.

Polishing

The cured panels are polished to a high gloss in this step of the process, preferably with panel polishing machinery of the type used for granite. The polishing operation is performed by a series of sanding operations starting with coarse abrasives and ending with fine abrasives. The panels are placed on a moving belt whose speed is controllable. At maximum belt speeds, the rate of polishing is 1500 sq. ft. per hour. The abrasives are attached to 14 heads, which come down onto a panel at controllable pressures. The panel is polished by a combination of rotation and pressure of the head and belt movement.

The present invention will be illustrated in more detail by the following examples without limiting the scope of the claimed process and formulations in any way.

EXAMPLE 1

A material made in accordance with the invention process was produced. The mold used was in the form of a flat panel having the dimensions 96"×48" and was approximately 1 inch in thickness. The composition used is detailed in Table I below and included no pigment. This panel contains recycled soda lime glass (clear glass) and particle sizes range from No. 2 mesh down to No. 100 mesh. This formulation compared with Example 2 and Example 9 is used to demonstrate the ability to change appearance through particle size distribution.

TABLE I

| Panel Thickness (inch) ‖ | 1 |
|---|---|
| | Calculated Wt. (Kg) |
| Portland Type I | 36.02 |
| Metakaolin | 3.94 |
| Water | 16.11 |
| Dispersant (Msterbuilder Glenium 3200) | 0.37 |
| Pigment | 0.00 |
| Viscosity Modifying Agent (Masterbuilders VMA 358) | 0.024 |
| Glass | 125.59 |
| Total | 182.05 |

EXAMPLE 2

A material made in accordance with the invention process was produced. The mold used was in the form of a flat panel having the dimensions 96"×48" and was approximately 0.5 inch in thickness. Four panels were produced from the composition detailed in Table II below. The recycled glass used was a combination of clear type and plate type soda lime glass and particle sizes range from No. 8 mesh down to No 100 mesh. This formulation compared with Example 1 and Example 9 is used to demonstrate the ability to change appearance through particle size distribution. The composition used included no pigment. This example along with Example 3 and others further demonstrates the ability to change the thickness of the panels.

TABLE II

| Panel Thickness (inch) ‖ | 0.5 |
|---|---|
| | Calculated Wt. (Kg) |
| Portland Cement Type III White | 20.34 |
| Metakaolin | 2.23 |
| Water | 9.11 |
| Dispersant (Masterbuilders Glenium 3200) | 0.17 |
| Viscosity Modifying Agent (Masterbuilders VMA 358) | 0.0123 |
| Glass | 70.95 |
| Total | 102.85 |

EXAMPLE 3

A material made in accordance with the invention process was produced. The mold used was in the form of a flat panel having the dimensions 96"×48" and was approximately 2 inches in thickness. The composition used is detailed in Table III below and included a green pigment and contains recycled clear type soda-lime glass with particle sizes ranging from No. 4 mesh down to No. 100 mesh. This composition demonstrates the use of pigment to modify appearance.

TABLE III

| Panel Thickness: ‖(inch) | 2 |
|---|---|
| | Calculated Wt. (Kg) |
| Portland Cement Type III | 72.49 |
| Metakaolin | 7.94 |

TABLE III-continued

| | |
|---|---|
| Water | 36.20 |
| Dispersant (Sikament 2000) | 1.12 |
| Green Pigment (Bayer GNFC) | 0.22 |
| Viscosity Modifying Agent (Sika VMA) | 0.05 |
| Glass | 252.82 |
| Total | 370.84 |

EXAMPLE 4

A material made in accordance with the invention process was produced. The mold used was in the form of a flat panel having the dimensions 96"×48" and was approximately 1.25 inches in thickness. The composition used is detailed in Table IV below and included a pigmented, colored glass (type opaque white glass, amber glass, Orange glass and clear glass). The particle size of the glass particles ranged from No. 4 mesh to No. 100 mesh. This example demonstrates the use of particle size, glass color and distribution to affect appearance.

TABLE IV

| Panel Thickness: ‖ | 1.25 |
|---|---|
| | Calculated Wt. (Kg) |
| Portland Cement Type III | 48.31 |
| Metakaolin | 8.52 |
| Water | 22.32 |
| Dispersant (Masterbuilders Glenium 3000) | 0.78 |
| Red Pigment (Bayer 110 C) | 2.18 |
| Black Pigment (Bayer 330 C) | 0.934 |
| Glass | 155.46 |
| Total | 238.5 |

EXAMPLE 5

A material made in accordance with the invention process was produced. The mold used was in the form of a flat panel having the dimensions 120"×60" and was approximately 1.25 inches in thickness. This material contains recycled clear type soda-lime glass with particle sizes ranging from No. 4 mesh down to No. 100 mesh. This demonstrates the ability to create large format panels.

TABLE V

| Panel Thickness: ‖ | 1.25 |
|---|---|
| | Calculated Wt. (Kg) |
| Portland Cement Type III White | 67.67 |
| Metakaolin | 11.94 |
| Water | 32.81 |
| Dispersant (Masterbuilders Glenium 3200) | 1.15 |
| Black Pigment | 9.09 |
| Glass | 228.51 |
| Total | 351.18 |

EXAMPLE 6

A material made in accordance with the invention process was produced. The mold used was in the form of a flat panel having the dimensions 96"×48" and was approximately 1.25 inches in thickness. Cobalt blue type recycled glass was used in this formulation with particle sizes ranging from No. 4 mesh down to No. 100 mesh. This formulation is more fluid and could be used in casting non-structural intricate patterns. The composition is described in Table VI below.

TABLE VI

| Panel Thickness: ‖ | 1.25 |
|---|---|
| | Calculated Wt. (Kg) |
| Portland Cement Type III | 44.04 |
| Metakaolin | 4.82 |
| Water | 26.88 |
| Dispersant (Masterbuilders 3200) | 0.32 |
| Viscosity Modifying Agent (Masterbuilders 358) | 0.08 |
| Glass | 153.59 |
| Total | 229.73 |

EXAMPLE 7

A material made in accordance with the invention process was produced. The mold used was in the form of a flat panel having the dimensions 96"×48" and was approximately 1.25 inches in thickness. This material contained recycled glass particle sizes ranging from No. 4 mesh down to No. 100 mesh. This formulation had increased recycled content through use of slag and additional ASR suppression.

TABLE VII

| Panel Thickness: ‖ | 1.25 |
|---|---|
| | Calculated Wt. (Kg) |
| Cement (Portland Type III) | 30.05 |
| Blast Furnace Slag | 15.1 |
| Metakaolin | 4.94 |
| Water | 21.49 |
| Dispersant (Masterbuilders Glenium 3200) | 0.46 |
| Glass | 157.48 |
| Total | 229.56 |

EXAMPLE 8

A material made in accordance with the invention process was produced. The mold used was in the form of a flat panel having the dimensions 96"×48" and was approximately 1.25 inches in thickness. This material contains recycled glass with particle sizes ranging from No. 4 mesh down to No. 200 mesh. This formulation shows a higher recycled glass content of 78 wt. %

TABLE VIII

| Panel Thickness: ‖ | 1.25 |
|---|---|
| | Calculated Wt. (Kg) |
| Portland Cement Type III | 22.5 |
| Metakaolin | 7.5 |
| Water | 18 |

TABLE VIII-continued

| | |
|---|---|
| Dispersant (Masterbuilders Glenium 3200) | 1.0 |
| Glass | 172.25 |
| Total | 221.25 |

EXAMPLE 9

A material made in accordance with the invention process was produced. The mold used was in the form of a flat panel having the dimensions 96"×48" and was approximately 1.25 inches in thickness. The panel was produced from the composition detailed in Table IX below. This formulation had a lower glass content to obtain a different aesthetic appearance. The material contains recycled glass particle sizes ranging from No. 4 mesh down to No. 100 mesh. This formulation compared with Example 1 and Example 2 is used to demonstrate the ability to change appearance through particle size distribution.

TABLE IX

| | |
|---|---|
| Panel Thickness: ‖ | 1.25 |
| | Calculated Wt. (Kg) |
| Portland Cement Type III White | 65.36 |
| Metakaolin | 7.155 |
| Water | 30.45 |
| Dispersant (Rheobuild 1000) | 1.07 |
| Glass | 113.84 |
| Total | 217.88 |

EXAMPLE 10

A material made in accordance with the invention process was produced. The mold used was in the form of a flat panel having the dimensions 3'×6' and was approximately 1.25 inches in thickness. The material includes recycled glass with particle sizes ranging from No. 4 mesh down to No. 100 mesh. The panel was produced from the composition detailed in Table X below. This example along with Example 5 and other examples demonstrate the ability to make panels of various dimensions.

TABLE X

| | |
|---|---|
| Panel Thickness: ‖ | 1.25 |
| | Calculated Wt. (Kg) |
| Portland Cement Type III | 23.6 |
| Metakaolin | 2.58 |
| Water | 14.4 |
| Dispersant (Masterbuilders Glenium 3200) | 0.24 |
| Viscosity Modifying Agent (Masterbuilders VMA 358) | 0.017 |
| Glass | 82.31 |
| Total | 123.16 |

EXAMPLE 11

A material made in accordance with the invention process was produced. The mold used was in the form of a flat panel having the dimensions 96"×48" and was approximately 1.25 inches in thickness. The panel was produced from the composition detailed in Table XI below. The material includes recycled glass with particle sizes ranging from No. 4 mesh down to No. 100 mesh. It includes fibers that act as a supplemental reinforcement to increase flexural strength and durability.

TABLE XI

| | |
|---|---|
| Panel Thickness: ‖ | 1.25 |
| | Calculated Wt. (Kg) |
| Portland Cement Type III | 41.96 |
| Metakaolin | 4.59 |
| Water | 25.61 |
| Dispersant (Materbuilders Glenium 3200) | 0.43 |
| Glass Fiber | 12.41 |
| Glass | 133.95 |
| Total | 218.95 |

The system used to produce the invention materials is capable of customizing products produced. For example, design proportions can be customized for variety of functional and aesthetic properties, incorporating use of most any glass cullet color and type. A wide range of colored panels can be produced and panel sizes are customizable from 0.5" to 2".

Product Characteristics and Test Results

The products made with the materials according to the invention have sustainability relative to material efficiency, durability, energy efficiency, and ecosystem/biodiversity impacts and have superior DFE (Design for the Environment) Performance characteristics. The invention is especially unique within the green building industry (professional designers, building code officials, owners, etc.) and can be used in conjunction with US Green Building Council's LEED v.2. The conventional performance characteristics of the materials include:

Abrasion Resistance (for the surface coating and for the body of the material)

Coefficient of Friction (slip resistance)

Table XII below shows the physical results that have been measured for the invention materials. The variation represents the values for different mix design/formulations.

TABLE XII

| | |
|---|---|
| Compressive Strength | 2000-16,750 psi |
| Flexural Strength | 648-1170 psi |
| Specific Gravity | 2.2-2.4 |
| Chemical Durability (ASTM C 1260 for ASR reactivity) | 0.02% |
| Porosity | 0.1% to 6.5% |
| Static Coefficient of Friction | 0.78 (dry) |

The materials produced according to the invention, and illustrated in the examples, are strong like granite, not as porous as marble and heat resistant like stone. Unlike petrochemical based products the invention material doesn't fade or yellow on exposure to UV rays.

The invention materials contain a high recycled content of post consumer and post industrial waste materials. The materials are used in a variety of applications including kitchen countertops, backsplashes, table tops, bathrooms, wall cladding, flooring, shower stalls, sinks, etc.

Finally, variations from the examples given herein are possible in view of the above disclosure. Therefore, although the invention has been described with reference to certain preferred embodiments, it will be appreciated that other compositions may be devised, which are nevertheless within the scope and spirit of the invention as defined in the claims appended hereto.

The foregoing description of various and preferred embodiments of the present invention has been provided for purposes of illustration only, and it is understood that numerous modifications, variations and alterations may be made without departing from the scope and spirit of the invention as set forth in the following claims.

What is claimed is:

1. A process to produce recycled glass/cement panels comprising:
    (a) delivering materials including (i) 25-79% by weight of glass having a particle size in the range of 1 μm to 25 mm; (ii) 19-30% by weight Portland cement; and (iii) an alkali-silica reaction suppressant selected from the group consisting of metakaolin, fly ash, silica fume and blast furnace slag present in an amount up to 22% by weight
    (b) adding up to 3% by weight of a dispersant and water to said materials to create a slurry that is inert, non-toxic and greater than 90% inorganic material, wherein the water content in said slurry ranges from 4% to 20% by weight;
    (c) mixing said slurry under conditions to avoid curing of the product during operation and to breakdown agglomerate and to mix said slurry;
    (d) casting said slurry into a mold having a dimension ranging from 48"×96" to 60"×120";
    (e) vibrating said mold to further spread said slurry in the mold evenly and to release all entrapped air at a vibration frequency in the range of 10-200 Hz and a vibration amplitude in the range of 0-5 mm;
    (g) curing said mold at temperatures ranging from 50 to 185° F. with a humidity range from 70% RH to 100% RH; and
    (h) removing the recycled glass/cement panel from said mold wherein said panel has a compressive strength between 2000-16,750 psi, a flexural strength between 648-1170 psi and a porosity between 0.1% to 6.5%.

2. The method according to claim 1, wherein said glass is in a crushed or ground form.

3. The method according to claim 1, wherein said curing is in a controlled environmental chamber.

4. The method according to claim 1, wherein said mold is in the form of a flat panel.

5. The method according to claim 1, wherein said mold is in the form of a 3-D objects.

6. The method according to claim 1, wherein said dispersant is selected from the group consisting of polycarboxylate based dispersants, naphthalene based dispersants, melamine based dispersants and lignosulphate based dispersants.

7. The method according to 1, wherein said mixture further comprises a pigment component present in an amount up to 15% by weight.

8. The method according to claim 1, wherein said mixture further comprises a fiber component present in an amount up to 5% by weight.

9. The method according to claim 1, wherein said mixture further comprising at least one material from the group consisting of stone chips, shell chips, mother of pearl chips, metal chips, air-entraining agents, anti-foaming agents, and viscosity modifying agents.

10. The method according to claim 1, comprising the further step of polishing the material removed from the mold.

11. The method according to claim 1, wherein said glass is amorphous silica and is selected from the group consisting of borosilicate glass, E-glass, soda-lime glass and colored glass.

12. The method according to claim 1, wherein particle size distribution of said glass is varied to control viscosity of said mixture.

* * * * *